United States Patent
Ehrmann et al.

(10) Patent No.: US 10,889,238 B2
(45) Date of Patent: Jan. 12, 2021

(54) METHOD FOR PROVIDING A SPATIALLY PERCEPTIBLE ACOUSTIC SIGNAL FOR A RIDER OF A TWO-WHEELED VEHICLE

(71) Applicant: Bayerische Motoren Werke Aktiengesellschaft, Munich (DE)

(72) Inventors: Michael Ehrmann, Karlsfeld (DE); Robert Richter, Munich (DE); Kerstin Schenk, Redwood City, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/662,838

(22) Filed: Oct. 24, 2019

(65) Prior Publication Data
US 2020/0055443 A1   Feb. 20, 2020

Related U.S. Application Data

(63) Continuation of application No. PCT/EP2018/056693, filed on Mar. 16, 2018.

(30) Foreign Application Priority Data

May 22, 2017   (DE) .................. 10 2017 208 600

(51) Int. Cl.
*B60J 3/00* (2006.01)
*B60Q 1/26* (2006.01)
(Continued)

(52) U.S. Cl.
CPC .............. *B60Q 1/2676* (2013.01); *B62J 3/00* (2013.01); *H04R 5/027* (2013.01); *B62J 45/10* (2020.02); *B62J 45/40* (2020.02)

(58) Field of Classification Search
CPC . B60Q 1/2676; B62J 3/00; B62J 45/10; B62J 45/40; H04R 5/027; H04S 1/005;
(Continued)

(56) References Cited

U.S. PATENT DOCUMENTS 3,908,168 A * 9/1975 McMahon ........... H04B 1/3822
                                                        455/11.1
5,959,597 A * 9/1999 Yamada ............... G02B 27/017
                                                        345/8
(Continued)

FOREIGN PATENT DOCUMENTS

CN         1230867 A    10/1999
CN       105872940 A     8/2016
(Continued)

OTHER PUBLICATIONS

International Search Report (PCT/ISA/210) issued in PCT Application No. PCT/EP2018/056693 dated Jun. 20, 2018 with English translation (five (5) pages).
(Continued)

*Primary Examiner* — Anh V La
(74) *Attorney, Agent, or Firm* — Crowell & Moring LLP

(57) ABSTRACT

A method for providing a spatially perceptible acoustic signal for a rider of a two-wheeled vehicle, including: providing an acoustic signal by a two-wheeled vehicle; determining the position of a helmet worn by the rider of the two-wheeled vehicle relative to the two-wheeled vehicle; processing the acoustic signal depending on the determined position to provide a three-dimensional output signal which constitutes a binaural projection of the acoustic signal; and outputting the output signal via a stereo headset of the helmet, wherein the output signal spatially positions a sound source contained in the acoustic signal depending on the determined position, whereby the sound source is spatially locatable by the rider of the two-wheeled vehicle.

20 Claims, 3 Drawing Sheets

(51) Int. Cl.
- *B62J 3/00* (2020.01)
- *H04R 5/027* (2006.01)
- *B62J 45/10* (2020.01)
- *B62J 45/40* (2020.01)

(58) Field of Classification Search
CPC .. H04S 7/304; H04S 2420/01; H04S 2400/01; A42B 3/0433
USPC ............... 340/432, 693.5, 692, 460, 457
See application file for complete search history.

(56) References Cited

U.S. PATENT DOCUMENTS

| | | |
|---|---|---|
| 9,578,419 B1 | 2/2017 | Abel et al. |
| 2003/0059070 A1 | 3/2003 | Ballas |
| 2003/0210800 A1 | 11/2003 | Yamada et al. |
| 2006/0194604 A1* | 8/2006 | Dieringer ............. H04B 1/385 455/550.1 |
| 2015/0336578 A1 | 11/2015 | Lord et al. |
| 2016/0185280 A1 | 6/2016 | Coles et al. |
| 2017/0066492 A1* | 3/2017 | Arkhangelskiy .... B60Q 1/2607 |
| 2017/0131762 A1* | 5/2017 | Liang .................... G06F 3/012 |
| 2018/0367937 A1 | 12/2018 | Asada et al. |

FOREIGN PATENT DOCUMENTS

| | | |
|---|---|---|
| WO | WO 2017/013671 A1 | 1/2017 |
| WO | WO 2017/061218 A1 | 4/2017 |

OTHER PUBLICATIONS

German-language Written Opinion (PCT/ISA/237) issued in PCT Application No. PCT/EP2018/056693 dated Jun. 20, 2018 (six (6) pages).

German-language Search Report issued in counterpart German Application No. 10 2017 208 600.9 dated Dec. 13, 2017 with partial English translation (17 pages).

Kim et al., "A Quaternion-Based Orientation Estimation Algorithm Using an Inertial Measurement Unit," IEEE, 2004, pp. 268-272 (five (5) pages).

Lavalle et al., "Head Tracking for the Oculus Rift," 2014, http://r8sl.cs.illinois.edu/~lavalle/papers/LavYerKatAnt14.pdf (eight (8) pages).

Foxlin, "Head-tracking relative to a moving vehicle or simulator platform using differential inertial sensors," Proceedings of Helmet and Head-Mounted Displays V, SPIE vol. 4021, AeroSense Symposium, Orlando, FL, Apr. 24-25, 2000 (12 pages).

Meina et al., "Position tracking using inertial and magnetic sensing aided by permanent magnet," Proceedings of the Federated Conference on Computer Science and Information Systems, ACSIS, 2016, IEEE, pp. 105-111, vol. 8 (seven (7) pages).

Chen et al., "Single-camera kinematic tracking using ArUco markers," Dec. 7, 2016, http://eecs.mines.edu/Courses/csci507/projects/2016/Actis_Chen.pdf (four (4) pages).

Lalwani, "Surrounded by sound: how 3D audio hacks your brain," The Verge, Feb. 12, 2015, http://www.theverge.com/2015/2/12/8021733/3daudio-3dio-binaural-immersive-vr-sound-times-square-new-york , pp. 1-5 (five (5) pages).

Hong et al., "Real-time sound propagation hardware accelerator for immersive virtual reality 3D audio," Proceeding I3D '17 Proceedings of the 21$^{st}$ ACM SIGGRAPH Symposium on Interactive 3D Graphics and Games Article No. 20, Feb. 25-27, 2017, San Francisco, California, pp. 1-7 (seven (7) pages).

English Translation of Chinese-language Office Action issued in Chinese Application No. 201880019624.4 dated Aug. 24, 2020 (eight (8) pages).

* cited by examiner

METHOD FOR PROVIDING A SPATIALLY PERCEPTIBLE ACOUSTIC SIGNAL FOR A RIDER OF A TWO-WHEELED VEHICLE

CROSS REFERENCE TO RELATED APPLICATIONS

This application is a continuation of PCT International Application No. PCT/EP2018/056693, filed Mar. 16, 2018, which claims priority under 35 U.S.C. § 119 from German Patent Application No. 10 2017 208 600.9, filed May 22, 2017, the entire disclosures of which are herein expressly incorporated by reference.

BACKGROUND AND SUMMARY OF THE INVENTION

The invention relates to a method and a system for providing a spatially perceptible acoustic signal for a rider of a two-wheeled vehicle. The invention further relates to a helmet which is worn by a rider of a two-wheeled vehicle during the use of the two-wheeled vehicle by the rider.

Through the use of a helmet during the use of a two-wheeled vehicle such as, e.g., a motorcycle or a motor scooter, the rider of the two-wheeled vehicle is acoustically decoupled from his environment. Since the spatial perception of noises is furthermore impaired through the use of a helmet, it is not possible for the rider of a two-wheeled vehicle to spatially assign signals or noises therein. In addition, the field of view is restricted when a helmet is used, so that operating and display elements of the two-wheeled vehicle can easily be overlooked.

In order to be able to communicate with a pillion passenger on the two-wheeled vehicle, motorcycle helmets are known which have a loudspeaker system and a microphone so that an intercom facility exists between the two riders of the two-wheeled vehicle. In order to enable a rider of a two-wheeled vehicle to be able to speak via his mobile radio telephone with another user, some helmets are also equipped with a Bluetooth communication unit via which a message exchange between the Bluetooth communication unit of the helmet and a mobile radio terminal device is enabled.

The object of the invention is to indicate a method and a system which enable the provision of a spatially perceptible acoustic signal for a rider of a two-wheeled vehicle. A further object is to indicate a helmet for a rider of a two-wheeled vehicle which enables the perception of spatial signals.

These objects are achieved by a method, system, and helmet according to the independent claims. Advantageous designs are set out in the dependent claims.

A method is proposed for providing a spatially perceptible acoustic signal for a rider of a two-wheeled vehicle. The method comprises the following steps: providing an acoustic signal by a two-wheeled vehicle, determining a pose of a helmet worn by the rider of the two-wheeled vehicle relative to the two-wheeled vehicle, processing the acoustic signal depending on the determined pose to form a three-dimensional output signal which represents a binaural projection of the acoustic signal, outputting the output signal via a stereo headset of the helmet, wherein the output signal spatially places a sound source contained in the acoustic signal depending on the determined pose, whereby the sound source is spatially locatable by the rider of the two-wheeled vehicle.

The invention is based on the notion that a noise source can be generated in three-dimensional space by means of a stereo headset present in a helmet by taking into account a pose of the helmet worn by the rider of the two-wheeled vehicle relative to the two-wheeled vehicle during the generation and output of the output signal. The pose is understood to mean the combination of position and orientation of the helmet, and therefore of the ears of the head of the rider of the two-wheeled vehicle, relative to the two-wheeled vehicle. It is thus possible to take into account whether the rider of the two-wheeled vehicle is looking in the direction of travel or obliquely/laterally in relation to the direction of travel. Since the location of the sound source remains constant, irrespective of the movement of the helmet and therefore of the pose, the impression of where the sound source is located relative to the rider of the two-wheeled vehicle can be conveyed to said rider through corresponding modification of the output signal and output via the stereo headset. As a result, the localization of the acoustic signal is simplified for the rider of the two-wheeled vehicle, which, for example, allows him a fast response.

The acoustic signal may be an actuation signal generated by the two-wheeled vehicle via an operating element, in particular an indicator lever or a multifunction controller, of the two-wheeled vehicle. While the rider of a motor vehicle can perceive the actuation, e.g., of an indicator lever, by means of a relay or the simulation of a noise of this type, this is not possible for the rider of a two-wheeled vehicle due to the helmet worn by him. In this case, the actuation signal generated by the indicator lever is processed as an acoustic signal together with the pose to form a three-dimensional output signal and is output via the stereo headset of the helmet. Depending on the switch setting (indicator is set to the right or left), the location of the sound source can be generated to the left or to the right of the two-wheeled vehicle. The two-wheeled vehicle rider thus obtains not only feedback indicating that the indicator lever is actuated, but also an indication of the direction in which the indicator lever has been actuated. Actuation signals can essentially be generated by all operating elements of the two-wheeled vehicle. The actuation signals may differ in terms of their location and/or their tonality and/or pitch depending on the actuated operating element. The local perception is also provided, irrespective of the pose of the helmet relative to the two-wheeled vehicle.

The acoustic signal may be a voice signal. The voice signal may, for example, be voice information output by an infotainment system of the two-wheeled vehicle, such as, e.g., a navigation announcement, a weather announcement, a traffic report, etc. A voice signal may also comprise feedback relating to the actuation of an operating element and the like. The voice signal may be a voice signal received from a different road user, in particular a rider of a two-wheeled vehicle. In this case, for example in the case of a larger group of riders of two-wheeled vehicles, the voice of a first rider of a two-wheeled vehicle signal may be generated in front on the left, of a second rider of a two-wheeled vehicle in front on the right, of a third rider of a two-wheeled vehicle behind on the left, etc. The local placement of the voice signals of different other riders of two-wheeled vehicles can also be positioned according to the actual position relative to the two-wheeled vehicle rider of the two-wheeled vehicle using the method.

The acoustic signal may be a warning signal from a driver assistance system. A driver assistance system of this type may, in particular, be a maneuvering or parking aid, similar to a park distance control of motor vehicles. For this purpose, as in the systems known from motor vehicles, the distance from obstacles and other road users (generally referred to as objects) can be measured by means of ultrasound sensors or other sensors. Depending on a reducing distance, the output signal can then be generated via the stereo headset depending on the location, e.g., behind on the left or behind on the right, in order to indicate to the rider of the two-wheeled vehicle that the two-wheeled vehicle is being approached from behind on the left or behind on the right. The output signal is generated depending on the pose of the helmet relative to the two-wheeled vehicle, e.g., a head turning to the left or to the right around the trunk axis of the body so that the location of the approach appears stationary due to the output signal output via the stereo headset. Orientation is thereby substantially simplified for the rider of the two-wheeled vehicle.

A driver assistance system can additionally be a blind spot system or a cross-traffic goods system of the type similarly well-known from motor vehicles. Provided that the two-wheeled vehicle has corresponding sensors, irrespective of whether the rider of the two-wheeled vehicle perceives a vehicle approaching laterally from behind by himself or via his mirror, can be indicated by an acoustic signal via the stereo headset. Irrespective of whether the other road user approaches from behind on the left or from behind on the right, the output signal is generated in such a way that the rider of the two-wheeled vehicle is given the impression that the road user is approaching from the corresponding side behind. A corresponding acoustic perceptibility can be implemented in the case of a cross-traffic warning system which is intended to simplify the entry into a road.

The acoustic signal may be a warning signal which is generated by the two-wheeled vehicle from information received by the two-wheeled vehicle, wherein the information is a warning tone from a different road user which is picked up by a microphone of the two-wheeled vehicle, wherein the information is a received message transmitted by a transmitter, representing a warning. The acoustic signal may, for example, represent a siren of an ambulance or of a police vehicle. Depending on the direction from which the road user activating the siren approaches the rider of the two-wheeled vehicle, this is synthesized as an output signal via the stereo headset. Since the generation of the output signal from the acoustic signal and the definition of the pose of the helmet are performed continuously, the movement of the acoustic signal can be projected in a simple manner and output via the stereo headset. In a different design, the acoustic signal may be information transmitted, for example, by a different vehicle via vehicle-to-vehicle communication. A stranded road user, for example, can thereby be signaled. Since a spatial reference of the location of the sound source or of the transmitter relative to the two-wheeled vehicle is always generated using the output signal, the location at which, for example, a source of danger is located, is immediately obvious to the rider of the two-wheeled vehicle.

The output of the output signal can provide not only information relating to the location of the sound source. In fact, an impression of how close the location of the sound source is relative to the two-wheeled vehicle or the rider of the two-wheeled vehicle can also be conveyed via the sound volume of the output signal. The output signal can, for example, become louder as the helmet comes closer to the location where the acoustic signal is generated (i.e., the location of the sound source).

According to one appropriate design, the pose of the helmet worn by the rider of the two-wheeled vehicle relative to the two-wheeled vehicle is defined by an inertial measurement unit in the helmet and/or in the two-wheeled vehicle. Alternatively or additionally, the pose of the helmet worn by the rider of the two-wheeled vehicle relative to the two-wheeled vehicle is defined by one or more cameras in the helmet and/or in the two-wheeled vehicle.

Methods for defining the rotation and or position of the helmet relative to the two-wheeled vehicle are known from the prior art. A single inertial measurement unit (IMU) can be used for this purpose, as described, for example, in reference [1] shown below. An alternative method for defining the pose by means of a single inertial measurement unit is described in reference [2]. Alternatively, differential methods of inertial measurement units can be used, as described, for example, in reference [3]. An arrangement for defining the pose from an inertial measurement unit and a magnetic tracking is described in reference [4]. Camera-based approaches for positioning are known, for example, from reference [5]. Technologically speaking, all of the aforementioned methods produce the same result, which differs only in terms of the quality of the defined pose.

According to a further appropriate design, the definition of the pose of the helmet worn by the rider of the two-wheeled vehicle relative to the two wheeled vehicle comprises at least one rotational movement of the helmet relative to the direction of travel of the two-wheeled vehicle. The circumstance wherein the rider of the two-wheeled vehicle performs a rotation of the head relatively frequently when riding the two-wheeled vehicle due to the restricted field of view as a result of wearing the helmet is thereby taken into account. The location of the sound source can thereby be provided to the rider of the two-wheeled vehicle with a relatively high accuracy through the suitable generation of the output signal in the helmet.

The localization of a sound source can be further improved if the definition of the pose of the helmet worn by the rider of the two-wheeled vehicle relative to the two-wheeled vehicle comprises a distance between the helmet and a handlebar of the two-wheeled vehicle and/or a different component of the two-wheeled vehicle. As a result, the location of the sound source in the event of an approach of the helmet relative to the handlebar or to the other component can be identified, for example, through variation of the sound volume of the output signal.

According to one appropriate design, the pose can be defined by means of a computing unit in the helmet. Alternatively, the pose can be defined by means of a computing unit in the two-wheeled vehicle. A variant is similarly conceivable in which the pose is defined by a computing unit in the helmet and also by a computing unit in the two-wheeled vehicle. Any required sensor data are then transmitted from the helmet to the two-wheeled vehicle or vice versa in order to be able to process all data required for the calculation of the pose in the computing unit concerned.

According to a further appropriate design, the acoustic signal is transmitted from the two-wheeled vehicle to the helmet of the rider of the two-wheeled vehicle and the output signal is defined by a computing unit in the helmet. Alternatively, the output signal is defined by a computing unit in the two-wheeled vehicle and the output signal is transmitted from the two-wheeled vehicle to the helmet of the rider of the two-wheeled vehicle.

According to a further appropriate design, the output signal is determined by a 3D sound processor by combining the acoustic signal and information representing the pose with one another to form the output signal. 3D sound processors of this type are sufficiently known from the prior art. The relevant principles can be found, for example, in references [6] and [7]. Generally speaking, algorithms of this type are based on time differences of signals until they reach the left and right auricles, and also different phases and amplitudes.

The invention furthermore proposes a system for providing a spatially perceptible acoustic signal for a rider of a two-wheeled vehicle according to the method described above. The system comprises a two-wheeled vehicle, a helmet to be worn by a rider of the two-wheeled vehicle, a unit for defining a pose of the helmet and a unit for defining the output signal. The two-wheeled vehicle comprises a first communication unit, wherein an acoustic signal containing at least one sound source is providable by the two-wheeled vehicle. The helmet to be worn by the rider of the two-wheeled vehicle comprises a second communication unit and a stereo headset to reproduce the audio signal. The unit for defining the pose serves to define the pose of the helmet relative to the two-wheeled vehicle. The unit for defining the output signal is designed to process the acoustic signal depending on the determined pose to form the three-dimensional output signal which represents a binaural projection of the acoustic signal.

The proposed system has the same advantages as those described above in connection with the method according to the invention According to one appropriate design, the helmet and/or the two-wheeled vehicle comprise(s) an inertial measurement unit and/or one or more cameras.

According to a further appropriate design, the helmet or the two-wheeled vehicle comprises the unit for defining the pose of the helmet.

According to a further appropriate design, the helmet or the two-wheeled vehicle comprises the unit for defining the output signal.

In addition, the system may comprise further means to carry out the method described here.

A helmet for providing a spatially perceptible acoustic signal for a rider of a two-wheeled vehicle is furthermore provided by the invention, the helmet serving to be used in the method described here. The helmet comprises a communication unit, a stereo headset to reproduce an audio signal and a unit for defining the output signal by processing the acoustic signal depending on a determined pose to form the three-dimensional output signal which represents a binaural projection of the acoustic signal.

According to one appropriate design, the helmet can comprise an inertial measurement unit. According to a further appropriate design the helmet can comprise a unit for defining the pose of the helmet.

The invention is explained in detail below on the basis of an example embodiment in the drawing. The same features are denoted with the same reference numbers in the drawings, wherein:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
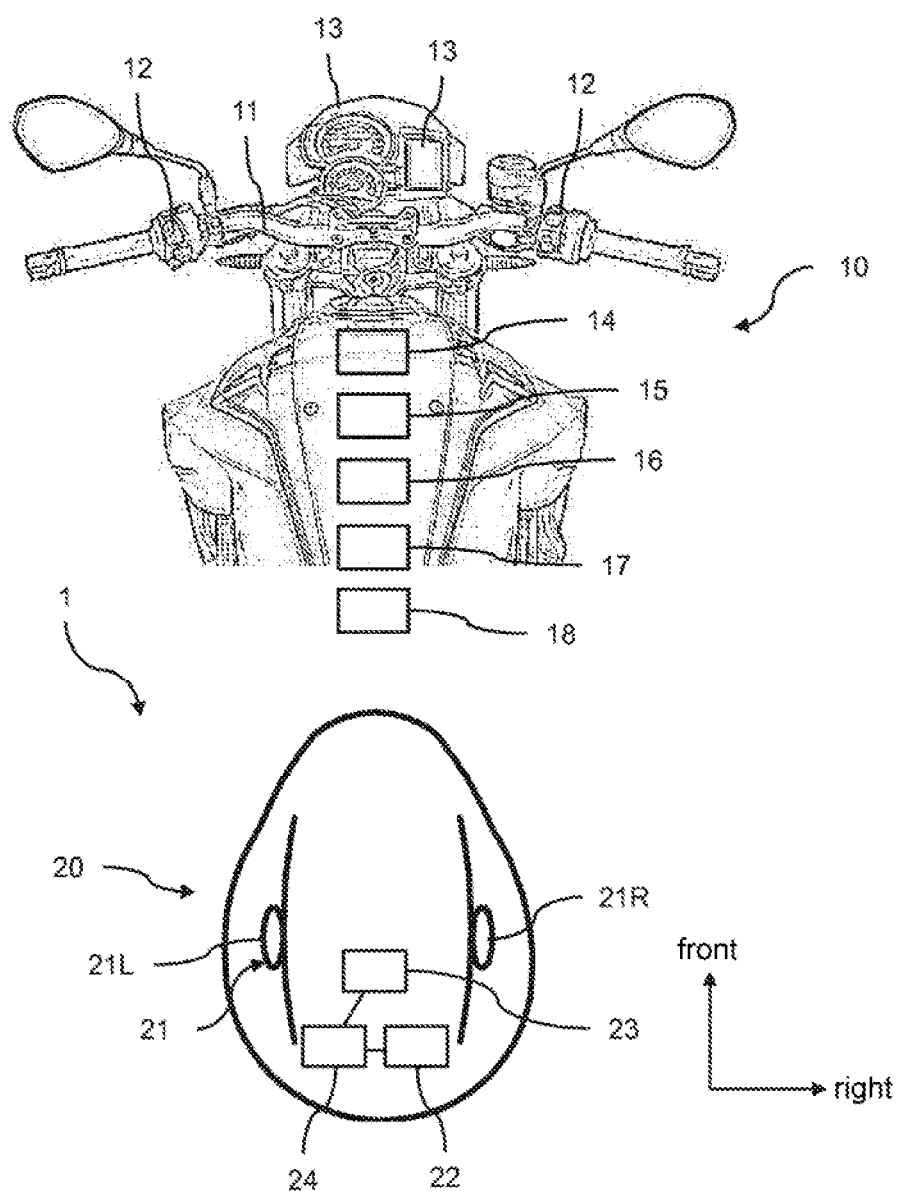
FIG. 1 shows a schematic representation of a two-wheeled vehicle and a helmet, wherein the helmet is located in a first pose relative to the two-wheeled vehicle.
Figure 2:
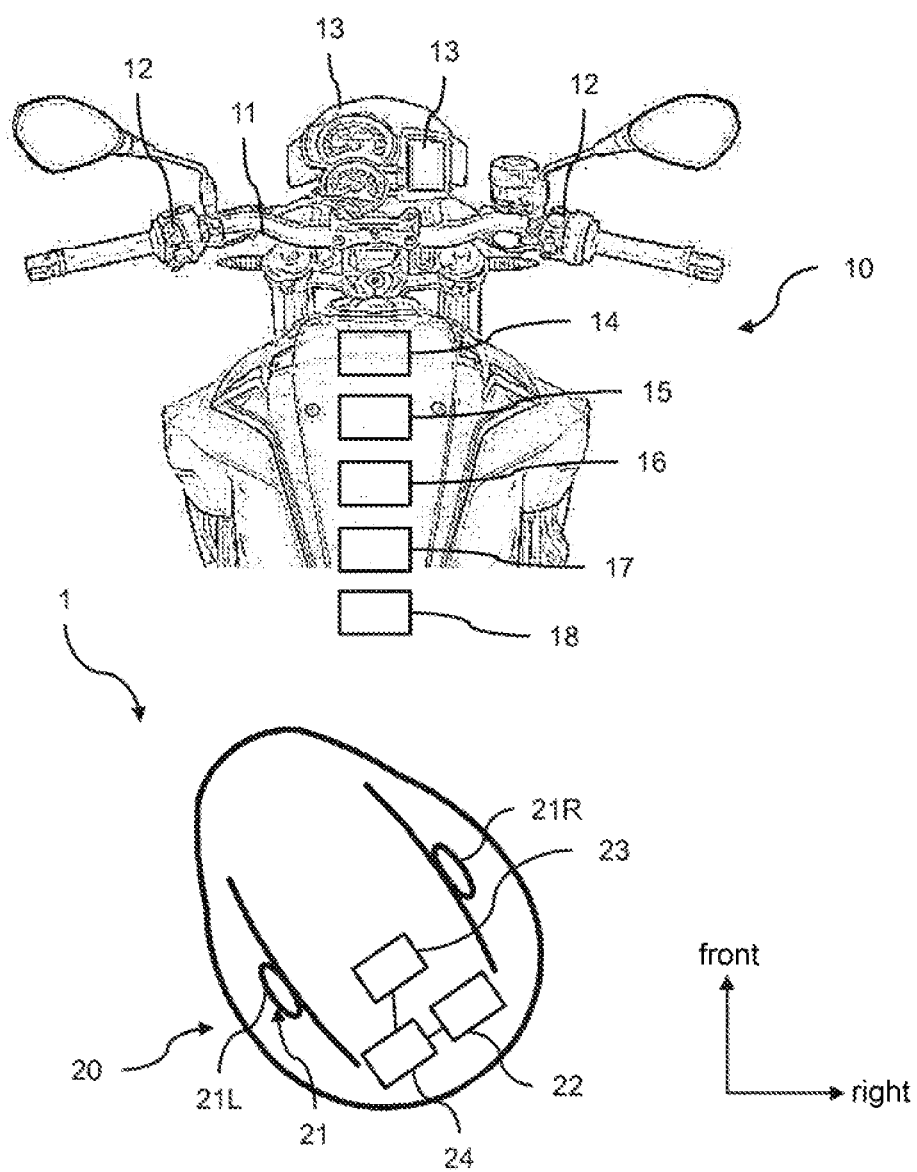
FIG. 2 shows a schematic representation of a two-wheeled vehicle and a helmet, wherein the helmet is located in a second pose relative to the two-wheeled vehicle.

FIGS. 1 and 2 in each case show, in a schematic view, the essential components of a system 1 according to the invention for providing a spatially perceptible acoustic signal for a rider of a two-wheeled vehicle.

The system comprises a two-wheeled vehicle 10 which is shown only in sections, and a helmet 20 which is to be worn by a rider of the two-wheeled vehicle (similarly not shown) during the use of the two-wheeled vehicle 10.

In a customary manner, the two-wheeled vehicle 10 comprises a handlebar 11, operating elements 12, display elements 13, etc. The operating elements 12 are fitted in a customary manner to the handlebar 11. The operating elements 12 comprise switches, such as, e.g., a light switch, a horn, an indicator and the like. The display elements 13 are similarly disposed on or in the area of the handlebar 11 and comprise a speed indicator, a rev counter (digital and/or analog) and a display to visualize status information of the two-wheeled vehicle 10, maps, navigation displays and the like. The display element 13 can be designed as an infotainment system. The actuation of a respective operating element 12 is normally accompanied by a visualization of the actuation, e.g., a (flashing) light.

The two-wheeled vehicle 10 can additionally have one or more driver assistance systems 18. Driver assistance systems known from motor vehicles have recently been adopted as driver assistance systems 18 and have been adapted to the two-wheeled vehicle 10. These include, for example, a maneuvering and parking aid which monitors the area that is not visible or is only poorly visible to the rider of the two-wheeled vehicle using one or more ultrasound sensors, particularly in the rearward area of the two-wheeled vehicle, in order to supply information relating to, e.g., distances to a nearby object during maneuvering or reversing. Due to the helmet 20 worn by the rider of the two-wheeled vehicle, the rider is acoustically decoupled from his environment and for this reason data processed by the driver assistance system 18 are visualized, e.g., on the display element 13. The driver assistance system 18 can additionally provide a blind spot system, e.g., using the aforementioned ultrasound sensors, which enables the approach of a travelling object laterally from behind. A signaling of this type can be performed, in the same way as in motor vehicles, e.g., using a warning light integrated into the left or right wing mirror. Cross-traffic warning systems which warn the rider of a two-wheeled vehicle of crossing objects when entering a poorly visible intersection are conceivable as further driver assistance systems. The detection of the cross-traffic can be implemented using ultrasound sensors and/or cameras. Information relating to cross-traffic can be visualized via the display element 13.

The two-wheeled vehicle 10 additionally comprises a communication unit 14, an optional unit 15 for defining an output signal, an optional camera 16 and a central control unit 17.

The communication unit 14 is designed to exchange data with a corresponding communication unit 22 of the helmet 20. In addition, the communication unit 14 can be configured to exchange data, e.g., with the display element 13 (in the form of an infotainment system) or with a mobile communication terminal device (not shown) of the rider of the two-wheeled vehicle or with other mobile communication terminal devices. In other words, the communication unit 14 which may comprise a multiplicity of different communication components based on different communication standards provides general communication functions. The optional unit 15 for defining the output signal and the optional camera 16 are controlled by the central control unit 17. Their function is described in detail later below.

In a known manner, the helmet 20 to be worn by the rider of the two-wheeled vehicle during the use of the two-wheeled vehicle 10 comprises a stereo headset 21 with a left loudspeaker 21L and a right loudspeaker 21R, a communication unit 22 to communicate with the already-described communication unit 14 of the two-wheeled vehicle 10, an optional inertial measuring unit (IMU) 23 and an optional unit 24 for defining the output signal.

Output signals received from the communication unit 22 can be output via the left and right loudspeakers 21L, 21R of the stereo headset 21. The output signal can comprise, for example, a voice signal, but also other noise sources, as will be explained more precisely below.

The communication unit 22 can communicate with the communication unit 14 of the two-wheeled vehicle 10 via any communication standard. Short-range communication standards such as, e.g., Bluetooth, Zigbee or WLAN, are appropriate.

In the preceding description, the unit 15 for defining the output signal and the camera 16 of the two-wheeled vehicle 10, and also the inertial measurement unit 23 and the unit 24 for defining the output signal of the helmet 20 have been referred to in each case as optional. This is to be understood in such a way that either the camera 16 of the two-wheeled vehicle 10 or the inertial measurement unit 23 of the helmet 20 is provided in a minimum configuration of the system. This means that in each case one of the components is mandatory, the other optional. In a different design, both the camera 16 and the inertial measurement unit 23 can be provided.

In a corresponding manner, either the unit 15 or the unit 24 for defining the output signal is electively provided in the two-wheeled vehicle 10 or in the helmet 20 in a minimum configuration. In a different design variant, both the unit 15 and the unit 24 for defining the output signal can be provided in the two-wheeled vehicle and in the helmet 20.

Figure 3:
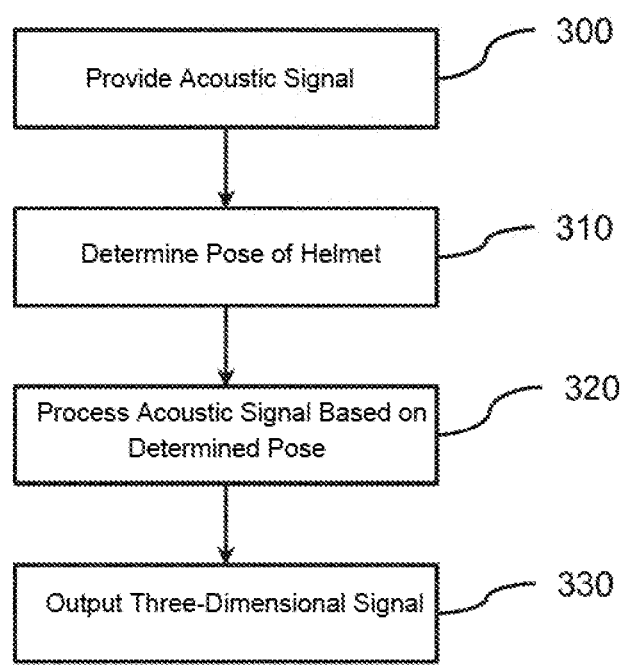
FIG. 3 shows a schematic representation of the process of the method according to the invention.

Since the rider of the two-wheeled vehicle is acoustically decoupled from his environment due to the wearing of his helmet 20 during the use of the two-wheeled vehicle 10, the perception and, in particular, location of sound sources has hitherto been virtually to totally impossible. The proposed system enables the provision of a spatially perceptible acoustic signal for the rider of a two-wheeled vehicle. The method is carried out according to the process shown in FIG. 3.

In step 300, an acoustic signal is provided by the two-wheeled vehicle. The acoustic signal can be an actuation signal of one of the operating elements 12 generated by the two-wheeled vehicle 10. If, for example, the rider of the two-wheeled vehicle actuates the indicator lever, an acoustic signal is generated and provided as in the case of a motor vehicle. The acoustic signal is generated electronically and is perceptible only when the helmet 20 is used.

The acoustic signal may also be a voice signal, in particular of the infotainment system 13 of the two-wheeled vehicle 10. The voice signal may also be a voice signal received from a different road user, in particular a rider of a two-wheeled vehicle, the signal having been received by the two-wheeled vehicle 10 via its communication unit 14. The acoustic signal may further be a warning signal of the aforementioned driver assistance system 18. For this purpose, sensorially determined signals are evaluated by the driver assistance system 18 and an acoustic signal corresponding to the driving situation, e.g., signaling the approach to an obstacle while maneuvering, is generated. Alternatively, the acoustic signal may be a warning signal which is generated by the two-wheeled vehicle 10 from information received by the two-wheeled vehicle 10. Information of this type can be received via the communication unit 14. This can be received by the two-wheeled vehicle 10, for example, from a different road user by means of vehicle-to-vehicle communication. The warning signal may also be a warning signal actually present in the vicinity of the two-wheeled vehicle which is picked up by a microphone (not shown) of the two-wheeled vehicle and is converted by the computing unit 17 into the acoustic signal.

In step 310, a pose of the helmet 20 worn by the rider of the two-wheeled vehicle relative to the two-wheeled vehicle 10 is determined. The pose is the combination of position and orientation of the helmet 20 in three-dimensional space relative to the two-wheeled vehicle 10. In particular, a rotation of the helmet 20 is detected relative to the vertical axis or body axis of the rider relative to his starting position shown in FIG. 1 in which the rider of the two-wheeled vehicle is looking forward. Alternatively or additionally, a distance of the helmet relative to an operating element, in particular the handlebar 11 of the two-wheeled vehicle 10, can also be detected.

The pose of the helmet 20 relative to the two-wheeled vehicle 10 is determined using the inertial measurement unit 23 and/or the camera 16 of the two-wheeled vehicle 10. Methods required for this purpose in order to determine the position and orientation in three-dimensional space are known from the prior art, so that a detailed description of the precise determination is not required.

In step 320, the provided acoustic signal is processed depending on the determined pose. The result of the processing is a three-dimensional output signal which represents a binaural projection of the acoustic signal and places the acoustic signal, according to the location of the occurrence relative to the two-wheeled vehicle, in three-dimensional space. The three-dimensional output signal is determined by means of the unit 15 and/or 24 for defining the output signal. The corresponding units 15 and 24 can be designed for this purpose as 3D sound processors. Corresponding algorithms for providing the three-dimensional output signal are known from the prior art, so that a detailed description is not required here either.

If the three-dimensional output signal is generated by means of the unit 15 of the two-wheeled vehicle 10, the acoustic signal and the information representing the pose are made available to the unit 15. If the pose is determined by the camera 16 of the two-wheeled vehicle 10, all the information required in order to determine the three-dimensional output signal is present in the two-wheeled vehicle 10. Conversely, if the pose is determined by means of the inertial measurement unit 23 of the helmet 20, corresponding data are transmitted from the communication unit 22 to the communication unit 14 of the two-wheeled vehicle 10 and are then fed to the unit 15 for processing.

If the three-dimensional output signal is defined by the unit 24 of the helmet 20, the acoustic signal is transmitted from the communication unit 14 of the two-wheeled vehicle 10 to the communication unit 22 of the helmet 20. The information representing the pose is similarly transmitted by means of the communication units 14, 22 from the two-wheeled vehicle 10 to the helmet 20 if the information has been determined by the camera 16. Conversely, the transmission of these data is not required if the pose is carried out by means of the inertial measurement unit 23 in the helmet 20.

In step 330, the three-dimensional output signal is output via the stereo headset 21 of the helmet 20. The output signal is spatially placed depending on the determined pose in such a way that a sound source contained in the acoustic signal is spatially locatable by the rider of the two-wheeled vehicle.

If the rider of the two-wheeled vehicle actuates, for example, the indicator lever, the clicking of the indicator relay generated above is generated as an acoustic signal. If the indicator lever is, for example, the operating element located with the reference number 12 in the left area of the handlebar, the output signal is generated in such a way that, from the perspective of the rider of the two-wheeled vehicle, the clicking of the relay comes from the front on the left from the area of the handlebar 11. This is enabled through an adjustment of the signal transit times and the amplitudes of the signals between the left and right loudspeaker 21L, 21R. If the rider of the two-wheeled vehicle turns his head slightly to the left through the vertical axis of the two-wheeled vehicle or his body axis, as shown in FIG. 2, the time differences and signal amplitudes are adjusted so that the location of the sound source is still perceived by the rider of the two-wheeled vehicle as originating from the left area of the handlebar 11.

If the rider of the two-wheeled vehicle uses a parking assistance system while maneuvering, if the two-wheeled vehicle 10 approaches an object behind on the right, the acoustic signal is converted into the output signal in such a way that the rider perceives the warning tone as originating from behind on the right. With a turn of the head, in the same way as normally performed by the rider of a two-wheeled vehicle while maneuvering, signal transit times and signal amplitudes are in turn adjusted so that the location of the sound source, i.e., the approach tone, remains statically behind on the right behind the two-wheeled vehicle 10.

When travelling in a group with a plurality of riders, a fixed location relative to the rider's own two-wheeled vehicle 10 can be allocated acoustically to the other participants by means of the proposed method. Spoken messages from a first rider who is located, for example, to the right of the two-wheeled vehicle 10 appear to be coming from the right. In the case of a different, second rider of a two-wheeled vehicle who is located to the left behind the rider's own two-wheeled vehicle 10, the output signal is generated on reception of corresponding voice signals in such a way that the second rider of a two-wheeled vehicle appears to be on the left behind the motorcycle.

The method also enables the provision of an extended voice assistant. If an attempt is made, for example, to locate a specific component of the two-wheeled vehicle, the output signal can be made louder or quieter depending on a correct or incorrect approach to the component in question. As a result, the rider of the two-wheeled vehicle receives an acoustic indication of whether he is moving closer to or further away from the required component. A voice assistance system can place indications directly on the operating element. If the user requests, for example, the functionality of the light switch, the voice assistant can form the sound signal in such a way that the user can find the switch more easily.

The localization of acoustic signals enables the rider of a two-wheeled vehicle to respond more safely and more quickly. The implementation of a driver assistance system, such as, e.g., a park distance control, is possible without the two-wheeled vehicle having to be equipped with a screen or further loudspeakers.

When travelling in a group, the cognitive load for the rider of a two-wheeled vehicle is reduced in the localization of individual fellow riders.

The implementation of functionalities which normally require output units fitted to the motorcycle is furthermore enabled.

REFERENCE NUMBER LIST

1 System for providing a spatially perceptible acoustic signal
10 Two-wheeled vehicle
11 Handlebar
12 Operating element
13 Display element/infotainment system
14 Communication unit
15 Unit for defining the output signal (3D sound processor)
16 Camera
17 Central control unit
18 Driver assistance system
20 Helmet
21 Stereo headset
21L Left loudspeaker
21R Right loudspeaker
22 Communication unit
23 Inertial measurement unit (IMU)
24 Unit for defining the output signal (3D sound processor)

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCES

[1] A. Kim et al.: "A Quaternion-Based Orientation Estimation Algorithm Using an Inertial Measurement Unit", 2004, IEEE, pp. 268-272
[2] S. LaValle et al.: "Head Tracking for the Oculus Rift", available at http://msl.cs.illinois.edu/~lavalle/papers/LavYerKatAnt14.pdf
[3] E. Foxlin: "Head-tracking relative to a moving vehicle or simulator platform using differential inertial sensors", Proceedings of Helmet and Head-Mounted Displays V, SPIE Vol. 4021, AeroSense Symposium, Orlando, Fla., Apr. 24-25, 2000
[4] M. Meina et al.: "Position tracking using inertial and magnetic sensing aided by permanent magnet", Proceedings of the Federated Conference on Computer Science and Information Systems, ACSIS, Vol. 8, 2006, IEEE, pp. 105-111
[5] A. Chen et al.: "Single-camera kinematic tracking using ArUco markers", Dec. 7, 2016, available at http://ee-cs.mines.edu/Courses/csci507/projects/2016/Actis_Chen.pdf
[6] M. Lalwani: "Surrounded by sound: how 3D audio hacks your brain", The Verge, Feb. 12, 2015, available at http://wvnu.theverge.com/2015/2/12/8021733/3daudio-3dio-binaural-immersive-vr-sound-times-square-new-york
[7] D. Hong et al.: "Real-time sound propagation hardware accelerator for immersive virtual reality 3D audio", Proceeding, 13D'17 proceedings of the 21st ACM SIGGRAPH Symposium on Interactive 3D Graphics and Games, Article No. 20, San Francisco, Calif., Feb. 25-27, 2017

What is claimed is:

1. A method for providing a spatially perceptible acoustic signal for a rider of a two-wheeled vehicle, the method comprising:
    providing an acoustic signal by a two-wheeled vehicle;
    determining a pose of a helmet worn by the rider of the two-wheeled vehicle relative to the two-wheeled vehicle;
    processing the acoustic signal depending on the determined pose to form a three-dimensional output signal which constitutes a binaural projection of the acoustic signal;
    outputting the three-dimensional output signal via a stereo headset of the helmet, wherein the output signal spatially places a sound source contained in the acoustic signal depending on the determined pose, whereby the sound source is spatially locatable by the rider of the two-wheeled vehicle.

2. The method according to claim 1, in which the acoustic signal is an actuation signal generated by the two-wheeled vehicle via an operating element that includes an indicator lever or a multifunction controller, of the two-wheeled vehicle.

3. The method according to claim 1, in which the acoustic signal is a voice signal of an infotainment system of the two-wheeled vehicle or a voice signal received from a different road user.

4. The method according to claim 1, in which the acoustic signal is a warning signal from one of a driver assistance system, a blind spot system and a cross-traffic warning system of the two-wheeled vehicle.

5. The method according to claim 1, in which the acoustic signal is a warning signal which is generated by the two-wheeled vehicle from information received by the two-wheeled vehicle, wherein the information is a warning tone from a different road user which is picked up by a microphone of the two-wheeled vehicle, or wherein the information is a received message transmitted by a transmitter, representing a warning.

6. The method according to claim 1, in which the pose of the helmet worn by the rider of the two-wheeled vehicle relative to the two-wheeled vehicle is defined by an inertial measurement unit in the helmet and/or in the two-wheeled vehicle and/or by one or more cameras in the helmet and/or in the two-wheeled vehicle.

7. The method according to claim 6, in which the definition of the pose of the helmet worn by the rider of the two-wheeled vehicle relative to the two wheeled vehicle comprises at least one rotational movement of the helmet relative to the direction of travel of the two-wheeled vehicle.

8. The method according to claim 6, in which the definition of the pose of the helmet worn by the rider of the two-wheeled vehicle relative to the two-wheeled vehicle comprises a distance between the helmet and a handlebar of the two-wheeled vehicle and/or a different component of the two-wheeled vehicle.

9. The method according to claim 6, in which the pose is defined by a computing unit in the helmet and/or in the two-wheeled vehicle.

10. The method according to claim 1, in which the acoustic signal is transmitted from the two-wheeled vehicle to the helmet of the rider of the two-wheeled vehicle and the output signal is defined by a computing unit in the helmet.

11. The method according to claim 1, in which the output signal is defined by a computing unit in the two-wheeled vehicle and the output signal is transmitted from the two-wheeled vehicle to the helmet of the rider of the two-wheeled vehicle.

12. The method according to claim 10, in which the output signal is determined by a 3D sound processor by combining the acoustic signal and information representing the pose with one another to form the output signal.

13. A system for providing a spatially perceptible acoustic signal for a rider of a two-wheeled vehicle, comprising:
    a two-wheeled vehicle with a first communication unit, wherein an acoustic signal containing at least one sound source is providable by the two-wheeled vehicle;
    a helmet to be worn a rider of the two-wheeled vehicle with a second communication unit and a stereo headset to reproduce an output signal;
    a processor programmed to determine a pose of the helmet relative to the two-wheeled vehicle and determine the three-dimensional output signal by processing the acoustic signal depending on the determined pose to form the three-dimensional output signal which represents a binaural projection of the acoustic signal,
    wherein the three-dimensional output signal spatially places a sound source contained in the acoustic signal depending on the determined pose, whereby the sound source is spatially locatable by the rider of the two-wheeled vehicle.

14. The system according to claim 13, wherein at least one of the helmet and the two-wheeled vehicle comprises at least one of an inertial measurement unit and one or more cameras.

15. The system according to claim 13, wherein the helmet or the two-wheeled vehicle comprises the unit for defining the pose of the helmet.

16. The system according to claim 13, wherein the helmet or the two-wheeled vehicle comprises the unit for defining the output signal.

17. The system according to claim 13, further comprising a processor programmed to execute a program stored in a memory, the program, when executed, causing the processor to:
    provide the acoustic signal by the two-wheeled vehicle;
    determine the pose of the helmet worn by the rider of the two-wheeled vehicle relative to the two-wheeled vehicle;
    process the acoustic signal depending on the determined pose to form a three-dimensional output signal which constitutes the binaural projection of the acoustic signal;
    output the three-dimensional output signal via the stereo headset of the helmet, wherein the three-dimensional output signal spatially places the sound source contained in the acoustic signal depending on the determined pose, whereby the sound source is spatially locatable by the rider of the two-wheeled vehicle.

18. A helmet configured to provide a spatially perceptible acoustic signal for a rider of a two-wheeled vehicle, comprising:
    a communication unit that receives an acoustic signal of the two-wheeled vehicle;
    a stereo headset of the helmet of the rider that reproduces an audio signal;
    a processor programmed to determine a three-dimensional output signal to be output to the rider by processing the acoustic signal depending on a determined pose of a helmet worn by the rider of the two-wheeled vehicle relative to the two-wheeled vehicle to form a three-dimensional output signal which represents a binaural projection of the acoustic signal, and output the three-dimensional output signal to the rider via the stereo headset, wherein the three-dimensional output signal spatially places a sound source contained in the acoustic signal depending on the determined pose, whereby the sound source is spatially locatable by the rider of the two-wheeled vehicle.

19. The helmet according to claim 18, further comprising an inertial measurement unit.

20. The helmet according to claim 18, further comprising a unit for defining the pose of the helmet.

\* \* \* \* \*